United States Patent [19]

Löbig

[11] Patent Number: 4,836,045
[45] Date of Patent: Jun. 6, 1989

[54] CONNECTING ROD

[75] Inventor: Arnold Löbig, Russelsheim, Fed. Rep. of Germany

[73] Assignee: General Motors Corporation, Detroit, Mich.

[21] Appl. No.: 199,896

[22] Filed: May 26, 1988

[30] Foreign Application Priority Data

Jun. 6, 1987 [DE] Fed. Rep. of Germany ....... 3719112

[51] Int. Cl.⁴ .............................................. G05G 1/00
[52] U.S. Cl. ................... 74/579 E; 74/579 R; 123/197 AB
[58] Field of Search ............ 74/579 E, 579 R, 579 F, 74/585; 29/156.5 A; 123/197 AB, 197 AC; 92/212, 214, 222, 248, 187

[56] References Cited

U.S. PATENT DOCUMENTS

| | | | |
|---|---|---|---|
| 1,786,934 | 12/1930 | Briggs | 74/579 E |
| 2,429,410 | 10/1947 | Essl | 74/579 E |
| 3,285,098 | 11/1966 | Beveridge | 74/579 E |
| 3,822,609 | 7/1974 | Kotoc | 74/579 E |

FOREIGN PATENT DOCUMENTS

| | | | |
|---|---|---|---|
| 658462 | 7/1936 | Fed. Rep. of Germany | 74/579 E |
| 918423 | 9/1954 | Fed. Rep. of Germany | 74/579 E |
| 1575383 | 11/1969 | Fed. Rep. of Germany | 74/579 E |
| 718435 | 1/1932 | France | 74/579 E |
| 951201 | 10/1949 | France | 74/579 E |
| 1232602 | 10/1960 | France | 74/579 E |
| 8604122 | 7/1986 | World Int. Prop. O. | 74/579 E |

*Primary Examiner*—Richard E. Moore
*Assistant Examiner*—Vinh Luong
*Attorney, Agent, or Firm*—Robert J. Outland

[57] ABSTRACT

A multi-piece connecting rod is provided in which the piston pin bearing boss is divided along a transverse plane perpendicular to its bearing axis and is formed by extensions of two rod components provided with bearing holes while the crankpin bearing boss is divided along an axial plane through its bearing axis. For installation, the rod components are pivotable about the piston pin axis to open or unfold the crankpin end to receive the crankpin prior to closing and securing the rod components in their closed positions.

4 Claims, 3 Drawing Sheets

CONNECTING ROD

TECHNICAL FIELD

The present invention pertains to connecting rods for internal combustion engines and the like. In particular, the invention pertains to a connecting rod, having split bearing bosses disposed at its longitudinal ends for a piston pin and a crankpin, which includes two rod components essentially arranged on opposite sides of a central longitudinal plane defined by the bearing axes of the two bearing bosses, and wherein the rod components include extensions overlapping each other and the central plane and arranged one behind the other in the direction of the bearing axes with bores extending in the direction of the bearing axes.

BACKGROUND

A connecting rod of the type described above is disclosed as the embodiment of FIGS. 4 and 5 in German patent No. 658,462. This prior art connecting rod comprises two rod components joined along a longitudinal dividing plane and having ends designed to receive a piston pin and a crankpin. The rod components have U-shaped cross sections, the backs of which butt against each other at their ends adjacent to the piston pin bearing and to the crankpin bearing and are secured by connecting means.

The connecting means at the crankpin end comprise extensions of the side flanges of the U-shaped sections of each rod component. The extensions overlap the central plane and are provided with holes so that, after assembly of the rod components, the extension means are located one on top of another and can be connected to each other by a pin or bolt. In addition, one connecting means each is provided on either side, longitudinally, of the piston pin bearing at the piston pin end of the connecting rod. These two connecting means are shown as threaded bolts with nuts whose axes are disposed perpendicular to the central plane and, thus, perpendicular to the direction of the bearing axis. The threaded bolts at the piston pin end may also be replaced by two connecting means which correspond to those located at the crankpin end. Due to the form of the connecting means, the prior art connecting rod is expensive to manufacture and difficult to mount.

A two part connecting rod in which hemispherical protrusions are provided instead of a VL bearing boss for the piston pin is also disclosed in International Patent Application No. WO 86/04122. These protrusions are cast integral with the rod components and form bearings for a piston by engaging in the piston spherical segments of a matching shape. To insert the hemispherical protrusions into the spherical segments, the top part of the prior art connecting rod, which can be connected to the piston, is split in a dividing plane extending perpendicular to the bearing axis, while the dividing plane in the lower part of the connecting rod extends in the usual manner in the direction of the bearing axis. Furthermore, the top ends of the two rod components are beveled on their inner sides such that a wedge-shaped space is formed which permits the protrusions to be inserted into the spherical segments of the piston. The spherical segment-type bearing for the piston, which determines the type of assembly and consequently the shape of the prior art connecting rod, considerably restricts the use of this connecting rod.

SUMMARY OF THE INVENTION

The present invention provides a connecting rod which consists of a small number of parts, can be manufactured at low cost and can be mounted in a simple manner.

This is accomplished according to the present invention in that the dividing plane of one of the two bearing bosses, preferably that of the bearing boss associated with the piston pin, extends perpendicular to its bearing axis, wherein the bearing boss is formed by extensions of the two rod components overlapping the center plane, while the other bearing boss, preferably that associated with the crankpin, has a dividing plane passing through (incorporating) the bearing axis. Due to the crosswise (perpendicular to the bearing axis) division of the (e.g. piston pin) bearing boss, the components of this bearing—the two bearing boss halves and the pin passing through the bearing boss halves—can be assembled in a hinged manner. No additional connecting means are needed in the assembled state to hold together the components of this bearing. The separate connecting means needed for this bearing in the prior art connecting rod are thus eliminated in an advantageous manner, which leads to a substantial weight reduction and permits manufacture at a lower cost. In addition, the second order forces of inertia and the engine vibrations are reduced.

Due to the dividing plane of the piston pin bearing boss preferably extending perpendicular to the bearing axis and the resulting elimination of additional connecting means on the piston pin bearing, boss, simultaneous closure of the crankpin bearing split along the bearing boss axis, will not necessarily take place during the assembly of the piston pin bearing. The mounting of the connecting rod on the piston pin and on the crankpin can be carried out in separate steps in an extremely advantageous manner.

According to the present invention, the (e.g. piston pin) bearing with the bearing bosses split perpendicular to the bearing axis, which are formed by extensions of the rod components, is first assembled by pushing the pin member into the bores. The two rod components are then pivoted out or unfolded around this bearing axis in a tong-like manner and the other (e.g. crankpin) bearing member is then introduced between the spaced halves of the other (axially split) bearing boss, the rod components are pivoted or folded together, and the two parts of the axially split bearing boss are fastened to each other. Thus, the piston pin can advantageously first be introduced into the two haves of the crosswise divided bearing boss and mounted in the piston with the connecting rod attached. Due to the hinged design of this bearing, the two rod components can be unfolded in a tong-like manner, which considerably simplifies the mounting to the crankshaft crankpin. In addition, perfect symmetry of the two rod components is also possible. As a consequence of this, only one die is needed to manufacture same.

In an advantageous variant of the present invention, additional extensions are provided having bores for receiving at least one additional pin, preferably on the outer end of the crankpin bearing boss. This design permits an extremely simple connection of the two rod components, since the pin or pins must simply be inserted into the bores. The arrangement of the pin axis or axes in parallel to the bearing axes leads to an especially compact design of the crankpin bearing boss and to an especially small connecting rod enveloping curve, which permits a compact design of the crankcase. This design also leads to an additional weight reduction. This variant also makes it possible to make the two rod components perfectly symmetrical to each other, so that only one die will be needed in this case as well. Perfect symmetry is also achieved during the other treatments of the rod components, especially in terms of the bores for receiving an additional pin. A known threaded bolt, the other end of which is secured with a nut, can be used as a pin for connecting the two rod components.

A variant in which the pin (pins) is (are) designed as threaded bolts and in which one of the associated extensions on the two rod components has a through hole and the other has a threaded hole for the threaded bolt is especially advantageous. This offers the advantage that commercially available multipoint recessed head cap screws, e.g., Inner Torx, can be substituted for special, heavier and more complicated connecting rod screws or pin connections.

An embodiment in which extensions having bores for receiving two threaded bolts, essentially located along the central longitudinal plane of the connecting rod, are provided on both sides of the bearing for the crankpin, is advantageous in terms of the simplification of the connecting components and in view of the stocking of spare parts.

The present invention also offers favorable possibilities for assembly in that bores for receiving threaded bolts, which are preferably centrally disposed in the transverse direction of the connecting rod and essentially extend perpendicular to the dividing plane through the axis of the crankpin bearing, may be provided in the rod components on both sides of the crankpin bearing. This design is particularly favorable for manufacture since the machining of the dividing surfaces and of the bores can be carried out in one machine setup. This is also true of another variant in which bores for receiving a pin, preferably a threaded bolt, are provided in the rod components on the side of the crankpin bearing toward the piston pin bearing, and are preferably centrally disposed in the transverse direction of the connecting rod and essentially extend perpendicular to the dividing plane through the axis of the crankpin bearing, and in which extensions of the rod components on the side of the crankpin bearing away from the piston pin bearing are provided with bores for an additional pin, preferably a threaded bolt. This also leads to a compact design of the connecting rod and a small connecting rod enveloping curve, as well as a compact crankcase. In addition to light weight and low second order forces of inertia, the friction of the piston, the wear on the cylinder liner, as well as the fuel consumption, will be reduced.

Assembly may be facilitated by inclination of the dividing plane through the axis of the crankpin bearing relative to the central longitudinal plane.

Various embodiments of the present invention are shown in the drawings and will be explained below in greater detail.

DRAWING DESCRIPTION

Figure 1:
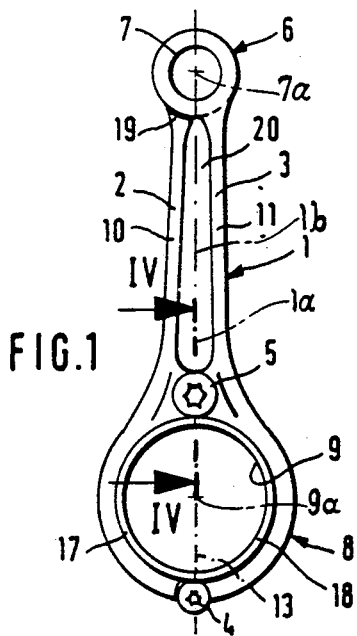
FIG. 1 shows a plan view of the connecting rod.
Figure 5:
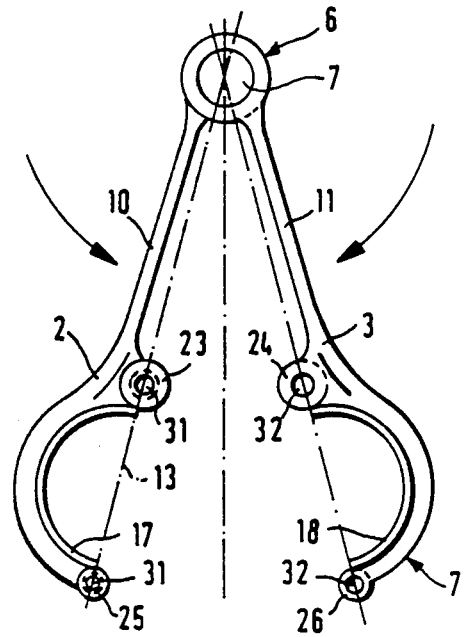
Figure 6:
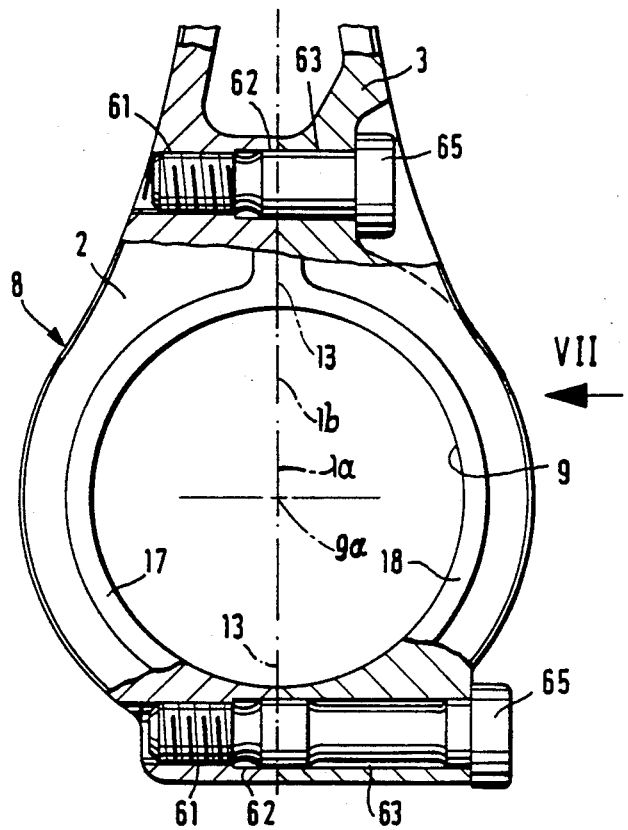
Figure 7:
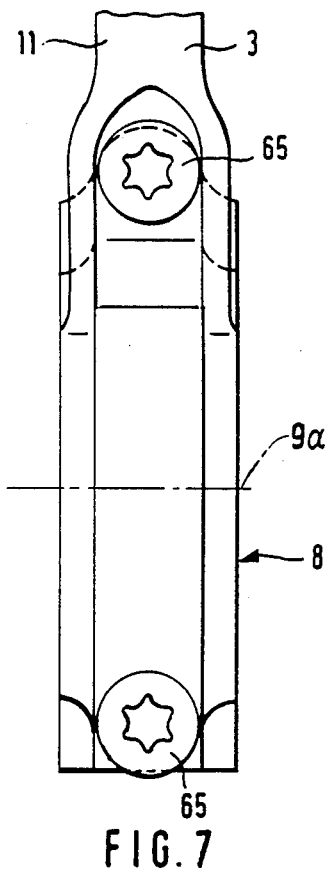
Figure 8:
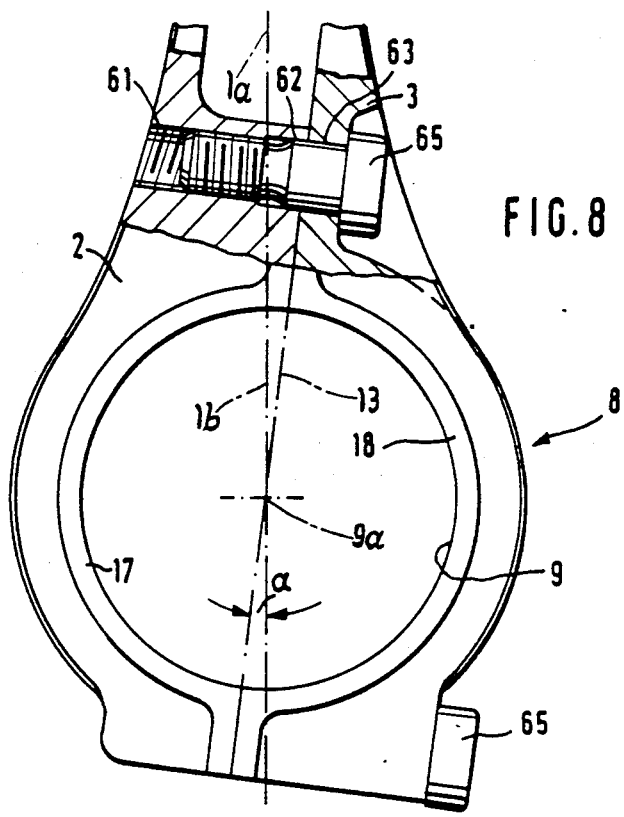
Figure 9:
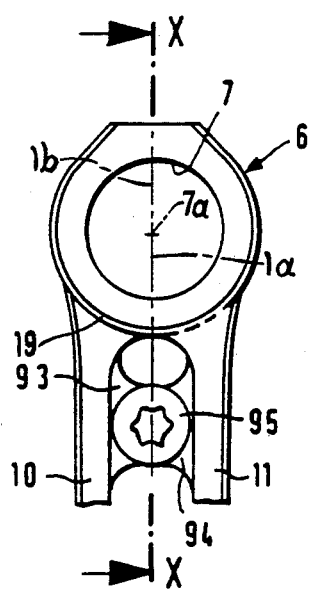
Figure 10:
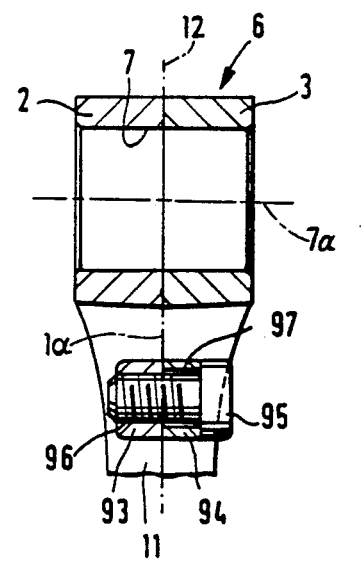

Figure a sectional view along the line 4—4 of FIG. 1;

FIG. 5 shows the connecting rod with the rod components in a partially assembled position;

FIG. 6 shows an alternative embodiment of the lower rod eye;

FIG. 7 shows a side view of the connecting rod eye according to FIG. 6;

FIG. 8 shows another embodiment of the lower connecting rod eye;

FIG. 9 shows alternative detail of the piston pin end of the connecting rod, and FIG. 10 shows a sectional view along the line 10—10 in FIG. 9.

Identical parts are designated by identical reference numerals in the figures.

DETAILED DESCRIPTION

Referring now to the drawings in detail, the connecting rod 1 has a central longitudinal axis 1a and comprises two rod components 2 and 3 which can be connected to each other by threaded bolts 4 and 5 in the form of threaded screws with Torx multipoint recessed head cap screws. At its upper longitudinal end in FIG. 1, the connecting rod has a piston pin bearing boss 6 with a bearing 7 centered on an axis 7a for receiving a piston pin (not shown) and, at its lower end, it has a crankpin bearing boss 8 with a bearing 9 centered on an axis 9a for receiving the crankpin (likewise not shown) of a crankshaft. The two bearing bosses 6 and 8 are connected to each other by webs 10 and 11. The extension of the webs 10 and 11 in the transverse direction defined by the direction of the bearing axes 7a, 9a is somewhat smaller than that of the bearing bosses 6 and 8.

The bearing bosses 6 and 8 are split. The piston pin bearing boss 6 is split along a dividing plane 12 which passes perpendicular to the bearing axis 7a and centrally relative to the transverse extension of the webs 10 and 11 and of the bearing boss 6. The boss 6 comprises two hollow cylindrical segments 15 and 16, each associated with one of the rod components 2 and 3. The crankpin bearing boss 8 is split along a dividing plane 13 which extends through the bearing axis 9a and the longitudinal axis 1a of the connecting rod 1. The plane 13 divides the bearing boss 8 axially and longitudinally into left and right lateral halves 17 and 18, which are associated with the rod components 2 and 3, respectively, and are disposed on opposite sides of a central longitudinal plane 1b defined by the axes of the bearings 7 and 9 and coextensive with the dividing plane 13.

Figure 3:
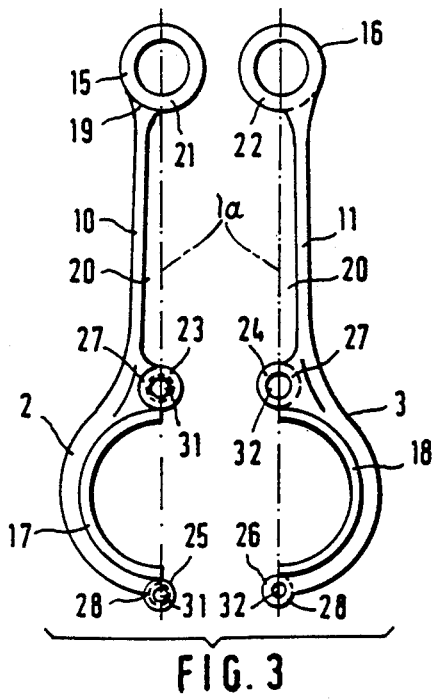
FIG. 3 shows the two rod components of the connecting rod of FIG. 1.

As is clearly apparent from FIG. 3, the rod component 2 carries the left lateral half 17 of the bearing 9 as well as the hollow cylindrical segment 15 of bearing 7 which includes an extension 21 that overlaps the central plant 1b by half. Analogously, the rod component 3 includes an extension 22 which forms the part of the hollow cylindrical segment 16 which overlaps the central plane 1b by half. Rod component 3 also carries the right longitudinal half 18 of the bearing 9. The two longitudinal bearing halves 17 and 18 correspond to the dimension of the bearing boss 8 in the axial direction. The two hollow cylindrical segments 15 and 16 are arranged coaxially, one behind the other in the direction of the bearing axis and each forms a half of the upper bearing boss 6.

Figure 2:
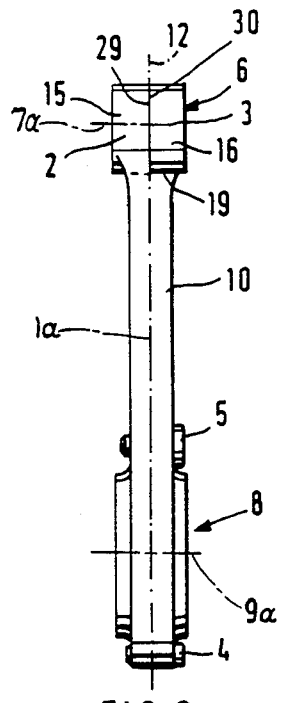
FIG. 2 shows a side view of the connecting rod of FIG. 1

In the zone of the bearing boss 6, the webs 10 and 11 are provided with clearance spaces extending in the transverse direction between the webs 10, 11 and the extensions 22, 21 of the opposite rod components 3, 2, respectively. For example, clearance space 19, located between the web 10 and the extension 22, is shown in FIGS. 1 and 2. The clearance spaces extend to the center of the web in the axial direction and somewhat further than the outer radius of the bearing boss 6—starting from its center—in the radial direction. Thus, they permit the two hollow cylindrical segments 15 and 16 of the bearing boss 6 to butt against each other and to be rotated relative to one another.

The webs 10 and 11 are spaced from the central plane 1b of the connecting rod 1 to define an opening 20 between them in the assembled state of the connecting rod 1.

The rod component 2 has two additional extensions 23 and 25 of semicircular cross section which overlap the central plane. These extensions form parts of round fastening eyes 27 and 28 which overlap the central plane 1b. In FIG. 3, these parts are adjacent the far end of the bearing boss 8 and are provided with threaded holes 31.

Analogously, the rod component 3 has two additional extensions 24 and 26 of semicircular cross section which overlap the central plane and form parts of the round fastening eyes 27 an 28. In FIG. 3, these parts are adjacent the near end of the bearing boss 8 and are provided with through holes 32.

Figure 4:
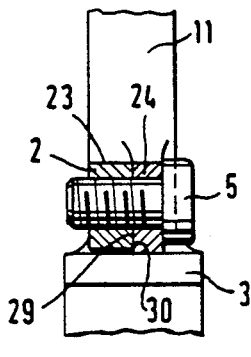

As is especially apparent from FIG. 4, the extensions 23 and 24 as well as 25 and 26 are arranged one behind the other in the direction of the bearing axes and they overlap each other in the mounted state of the connecting rod 1. They are held in contact with each other by threaded bolts 4, 5 in the form of Torx multipoint recessed head cap screws which are inserted into the holes. With contact surfaces 29 extending in a transverse central plane of the connecting rod 1, the extensions 21, 23 and 25 of the rod component 2 abut contact surfaces 30 of the extensions 22, 24 and 26 of the rod component 3.

The connection of the connecting rod with a piston (not shown) and the crankpin of a crankshaft (also not shown) will be explained below on the basis of FIG. 5. As is shown in FIG. 3, the rod components 2 and 3 are associated with each other, and the extensions 21 and 22 are overlapped to form the bearing boss 6 with the holes in the extensions 21 and 22 aligned with each other to form the bearing 7. The piston pin is inserted into the bearing 7 to connect it with an associated piston.

The two rod components 2 and 3, which can be pivoted around the bearing axis fixed by the piston pin are now pivoted out or unfolded in a tong-like manner by rotating at least one of the rod components 2 and 3 until they assume the position shown in FIG. 5 in the unfolded or opened state. The two lateral halves 17 and 18 of the hollow cylinder or bearing boss 8 forming the bearing 9 are thus spaced from each other an amount sufficient for introducing the crankpin. The assembly unit formed by the piston the piston pin and the rod components 2 and 3 is pushed for this purpose into the cylinder bore associated with the piston until a predetermined assembly position is reached. With the rod components folded together, the connecting rod can be pushed through the cylindrical bore from the top, which means that the bearing boss 8 can be pushed through the entire cylinder bore. Once the connecting rod with the bearing boss 8 has been completely pushed through the cylindrical bore, so that the rod components with the bearing boss 8 project from the cylinder bore at the bottom, the rod components can again be pivoted apart or unfolded so that the crankpin of the crankshaft can be introduced into the bearing 9. The unfolded rod components 2 and 3 are then folded together. In the folded-together state, the bearing 9 is closed and the threaded holes 31 and the through holes 32 are aligned with each other, so that the two threaded bolts 4 and 5 can be screwed in to hold the rod components 2 and 3 in contact with each other.

A modified embodiment of connecting means associated with the bearing boss 8 on the crankpin end is shown in FIGS. 6 and 7. Unlike in the above-described design, the axes of the threaded bolts extend perpendicular to the longitudinal plane 1b of the connecting rod 1 rather than in the direction of the axis of the bearing 9 in the center plane. stepped holes, which have, beginning from the dividing plane 13, a cylindrical section 62 and an adjoining threaded hole 61, are provided in the rod component 2; the cylindrical section 62 has the same diameter as the through hole 63 in the rod component 3. The threaded bolts 65 are designed as fit screws.

FIG. 8 shows an embodiment of the bearing boss 8 in which the dividing plane 13 receiving the bearing axis is inclined by an angle a relative to the central plane 1b defined by the axes 7a, 9a of the bearings 7 and 9. The dividing plane is inclined 7° from the central plane in the example. This bearing boss 8 otherwise corresponds to the above-described design shown in FIGS. 6 and 7.

FIGS. 9 and 10 show a connecting means for the two rod components 2 and 3 which is, in principle, of the same design and orientation as the connecting means shown in FIG. 4 and described above. A tongue-shaped extension 93 with a semicircular end section extends from the web 10 in a transverse plane. This extension overlaps the center plane between the two webs 10 and 11, while a tongue-shaped extension 94, which also overlaps the center plane with a semicircular end section, extends from the web 11. In FIG. 9, the extension 94 is located on the near side of the extension 93 in the transverse direction. The extension 93 has a threaded hole 96 and the extension 94 has a through hole 97, the two holes extending in the same direction (transverse direction) as the axis of the piston pin bearing 7. A Torx multipoint recessed head cap screw is provided as the threaded bolt 95. After folding up or closing the rod components 2 and 3, the threaded bolt 95 is screwed into the threaded hole 93. The connecting means shown is arranged next to the piston pin bearing boss 6 and may be provided, in addition to the connecting means, with the threaded bolts 4,5 (FIGS. 1 through 5) and 5 (FIGS. 6 through 8), which are arranged next to the bearing boss 8.

In an embodiment which is not shown, the two connecting means associated with the crankpin bearing 9 can be designed such that the lower of the two connecting means is arranged like the lower connecting means on the crankpin bearing 9 in FIGS. 1 through 5, while the upper of the two connecting means is arranged like the upper connecting means on the crankpin bearing 9 in FIGS. 6 and 7.

It is also possible to additionally provide connecting means according to FIGS. 9 and 10 The dividing plane 13 of the crankpin bearing 9 may also be inclined.

While the invention has been described by reference to certain preferred embodiments, it should be understood that numerous changes could be made within the spirit and scope of the inventive concepts described Accordingly it is intended that the invention not be limited to the disclosed embodiments, but that it have the full scope permitted by the language of the following claims.

The embodiments of the invention in which an exclusive property or privilege is claimed are defined as follows:

1. A connecting rod having split bearing bosses disposed at longitudinally opposite ends including a crankpin boss and a piston pin boss, the bosses defining bearing bores disposed on parallel bearing axes, said connecting rod comprising two rod components primarily located on opposite sides of a central longitudinal plane defined by the bearing axes and wherein
the crankpin boss is axially split along a dividing plane through its bearing axis, and
the piston rod is laterally split along a dividing plane normal to its bearing axis and includes extensions of the two rod components overlapping the central plane and linearly arranged along its bearing axis for receiving a piston pin,
said connecting rod further comprising securing means, including at least one pair of additional extensions overlapping the central plane and having openings aligned on an axis parallel with the central plane, and a securing pin received in each said pair of openings.

2. A connecting rod according to claim 1, wherein each said securing pin is a threaded bolt and the openings in each pair of additional extensions comprise a through-hole and a threaded hole for receiving and engaging their associated threaded bolt.

3. A connecting rod according to claim 2, wherein pairs of said additional extensions are provided on opposite sides of the crankpin bearing bore with said openings being provided for two of said threaded bolts, essentially located along the longitudinal central plane of the connecting rod.

4. A connecting rod according to claim 3, wherein another additional pair of extensions is provided adjacent to the small-end bearing boss with openings for a threaded bolt, located along the longitudinal central plane of the connecting rod.

* * * * *